June 7, 1949.  D. B. BANKS  2,472,459
METHOD AND APPARATUS FOR FEEDING ADSORBENT MATERIALS
TO STREAMS OF LIQUID HYDROCARBONS
Filed May 10, 1947  2 Sheets-Sheet 1

INVENTOR.
Daniel B. Banks
BY
Busser and Harding
Attorneys

June 7, 1949.                    D. B. BANKS                    2,472,459
             METHOD AND APPARATUS FOR FEEDING ADSORBENT MATERIALS
                         TO STREAMS OF LIQUID HYDROCARBONS
Filed May 10, 1947                                           2 Sheets-Sheet 2

INVENTOR.
Daniel B. Banks
BY

Attorneys

Patented June 7, 1949

2,472,459

UNITED STATES PATENT OFFICE 2,472,459

METHOD AND APPARATUS FOR FEEDING ADSORBENT MATERIALS TO STREAMS OF LIQUID HYDROCARBONS

Daniel B. Banks, Drexel Hill, Pa., assignor to Sun Oil Company, Philadelphia, Pa., a corporation of New Jersey Application May 10, 1947, Serial No. 747,290

9 Claims. (Cl. 196—147)

This invention refers generally to improvements in filtering processes and, more particularly, to methods and apparatus for depositing filtering adsorbent materials into streams of liquid hydrocarbons.

Lubricating oils and waxes are presently purified by using mineral adsorbents, the more important of which are the various fuller's earths, bentonite, various clays, magnesite, bog iron ore, bauxite, bituminous shale and others sold under trade names such as Decomat, Filtrol, Wilkinite, Palex, etc. One method is to deposit the adsorbent material continuously, in predetermined quantities, into a body of the liquid hydrocarbon to be treated. This is normally done in a slurry or treating tank located beneath a mechanical conveyor which carries the adsorbent material in weighed amounts to an opening where it is emptied into the petroleum product to be treated.

In the use of adsorbent materials to improve the color and adsorb impurities, the liquid hydrocarbons are preheated to reduce viscosity and put them in a fluid condition most acceptable to the treatment. The proper quantity of adsorbent material is deposited in the slurry tank through which the liquid hydrocarbons are continuously moving, adsorbing the impurities as a continuous function. The treated product is then passed to different types of apparatus in succession as required to produce the proper color and purity of the product.

Normally, the adsorbent material, which is deposited in the stream of liquid hydrocarbons, contains from 15% to 20% of moisture by weight, which is released as steam vapor on contact with the heated petroleum product. The released steam vapor passes upward through the opening in the slurry tank which admits the adsorbent material. On reaching a lower temperature, the vapor condenses and wets the adsorbent material which is on a mechanical conveyor about to be dumped into the slurry tank. It is then necessary to halt the process and clean the mechanical conveyor as the moisture which accumulated on the adsorbent material has reduced it to a pasty consistency which affects the accuracy of the scales and clogs the conveyor.

It is, therefore, an object of this invention to provide a method and apparatus for diverting the vapors released in the oil treating tank during the continuous-contact filtering process, thereby preserving the effectiveness of the adsorbent material as it is deposited in the body of liquid hydrocarbons.

Another object is to insure an uninterrupted contact filtering process by preventing the clogging of the apparatus which weighs and carries the adsorbent material.

Yet another object is to provide a method and apparatus which insures the proper quantities of adsorbent materials being deposited in the stream of liquid hydrocarbons being treated, hitherto affected by excessive moisture being adsorbed.

A further object is to recapture the suspended particles of adsorbent materials which have not contacted the liquid hydrocarbon from the vapor space of the treating or slurry tank and to return them to the process.

And a further object is to reduce the back pressure in the vapor space of the treating tank caused by moisture released from the adsorbent material as steam vapor and thus permit the greater part of the predetermined quantity of treating material to pass downward to the petroleum product to be treated.

In the accompanying drawings, forming a part of this specification, and in which like numerals are employed to designate like parts throughout the same, Figure 1 is an elevation of the apparatus.

Figure 2 is a sectional elevation of the heater.

Figure 3 is a section along line 3—3 in Figure 2.

Figure 1:
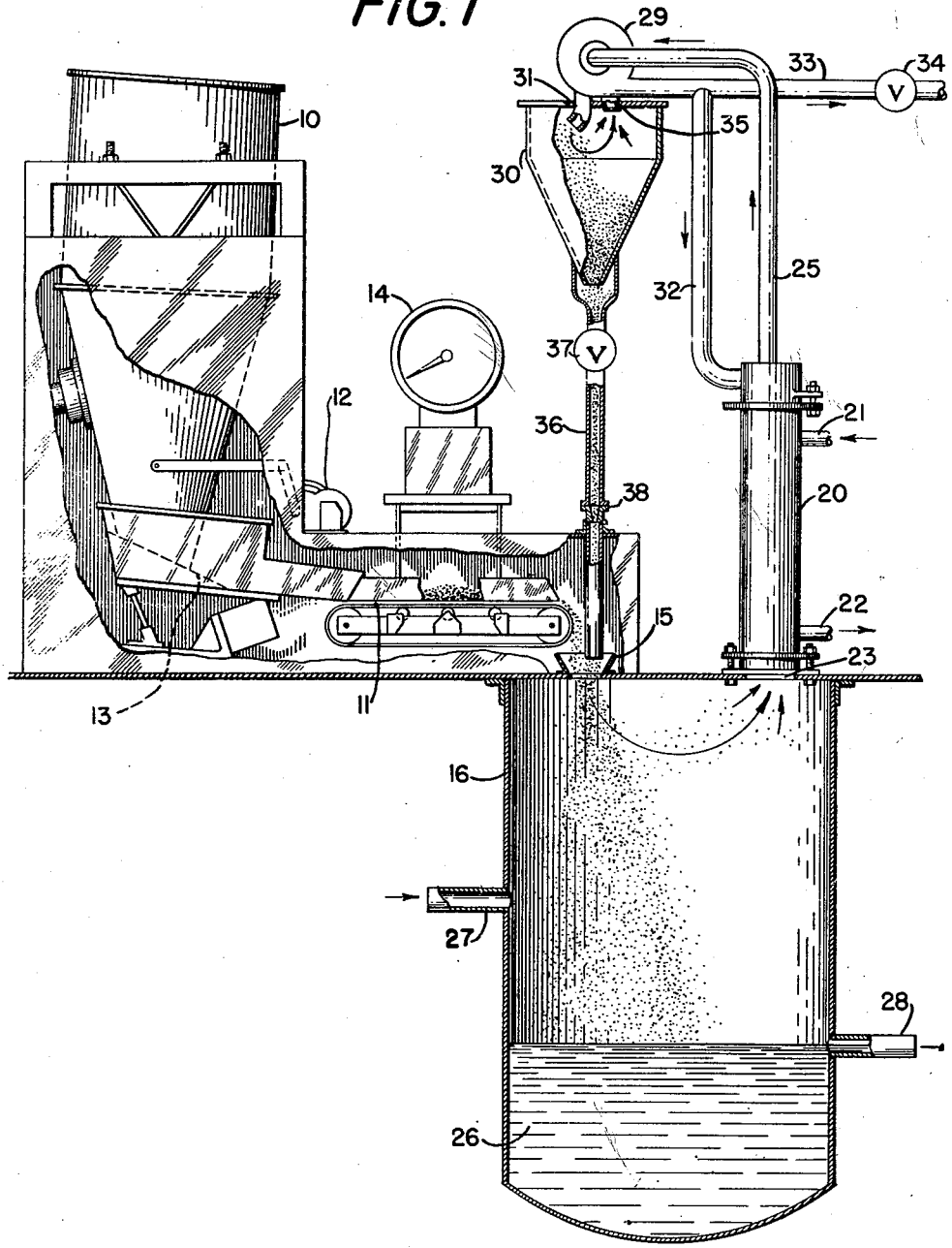

The equipment which is normally associated with depositing adsorbent materials in liquid hydrocarbons, together with the improvement disclosed by this specification, is illustrated in Figure 1. The hopper 10 receives the adsorbent material and passes it downward to a mechanical conveyor, shown as an endless belt 11, which forms part of the weighing machine as shown. To assure the proper flow of the clay or other adsorbent, an automatic control 12 adjusts the position of hopper 10 in its relation to the baffle plate 13 below it. Scale 14 indicates the weight of the clay on the endless belt 11, enabling the automatic regulation of the quantities of adsorbent deposited in the liquid carbon stream. Endless belt 11 deposits the adsorbent material through an opening 15 in the top of slurry tank 16. This generally describes a type of equipment in use today and is familiar to those versed in the art.

Under the usual operating conditions, moisture released from the adsorbent material as it is deposited in the slurry tank 16 passes upward through opening 15, condenses and attacks the adsorbent material on the slowly moving endless belt 11, reduces the adsorbent to a sticky paste and affects the weighing accuracy. The process must then be interrupted to clean the endless belt. To prevent this interruption of the process, and to insure the continuous supply of fresh adsorbent material in proper quantities, the method and apparatus forming the disclosure of this invention will now be described.

Reference is made to Figure 1 where the opening 15 in the top of the slurry tank through which the adsorbent material is deposited is modified to form a funnel of rectangular cross section. It is important that this funnel opening be small enough to create the maximum downdraft of air to insure the downward movement of the adsorbent material deposited by the mechanical conveyor, yet large enough to receive the full quantity of adsorbent material periodically necessary in the process. The funnel baffles, indicated in the drawing, surround opening 15 and guide the deposited material downward to the body of the liquid hydrocarbons in slurry tank 16. A tubular steam heater 20, having steam inlet and outlet conduits 21 and 22 respectively, is mounted over a second opening 23 in the roof of slurry tank 16. A jet 24 (Figure 2) is set over opening 23 to insure the mixing of the steam vapor arising from slurry tank 16 with the recycled vapor inside tubular steam heater 20 as more fully described later. The movement of the steam vapor from the slurry tank upward to the tubular steam heater 20 carries with it the smaller floating particles of undeposited adsorbent material affording a free downward passage of the bulk of the adsorbent material to be mixed in the continuously moving stream of liquid hydrocarbons 26. Inlet 27 passes the unpurified liquid hydrocarbons into the slurry tank 16 and outlet 28 permits them, now mixed with adsorbent materials, to flow outward to the later stages of the purification process. Agitators, baffles and other mechanical mixing devices have been omitted for clarity.

Steam vapor and air, together with the floating particles of adsorbent materials from the space above the liquid hydrocarbons in the slurry tank, pass upward through jet 24 where they are mixed with recycled vapor which has been preheated in the downward passage through tubular steam heater 20. The mixture of recycled vapor, the vapor from the treating tank and suspended adsorbent materials gathered in the base of the tubular steam heater pass upward through conduit 25, which forms part of a recycling system, to the centrifugal separator 29 of a type commercially available and well known in the art. The tubular steam heater 20 is placed adjacent to opening 23 and jet 24 on the top of the slurry tank to insure that the vapor from the treating tank and the recirculated vapor will mix and pass through the conduits of the recycling system in a superheated state to prevent any condensation.

The centrifugal separator 29, at the apex of the recycling system, receives the vapor and particles of adsorbent material from conduit 25, separates the adsorbent material, and deposits it through the outlet port 31 into the airtight hopper 30. The adsorbent free vapor is then discharged into conduit 33. At the juncture of conduits 32 and 33, which form the returns of the recycling system, a portion of the adsorbent free vapor is passed downward to tubular steam heater 20 where it is mixed with vapor from the treating tank as outlined above. The remainder of the adsorbent free vapor is passed to the atmosphere through conduit 33 and valve 34. By the operation of valve 34 the back pressure of the vapor in the top of slurry tank 16, which would otherwise move upward through opening 15, is controlled. If the valve 34 is opened wide, permitting the maximum venting to the atmosphere, withdrawal of vapor through jet 24 is a maximum and an excessive downdraft through opening 15 is caused. To balance the apparatus so that the maximum operating efficiency is obtained, valve 34 is partially closed, reducing the passage of vapor through the jet so that the moisture released as vapor from the incoming adsorbent material is diverted from opening 15 by creating a controlled downdraft.

The adsorbent material recovered from the circulated vapor is deposited by outlet 31 of centrifugal separator 29 in the airtight hopper 30. Hopper 30 is made airtight to permit the centrifugal separator 29 to operate as designed by the manufacturer. Part of the vapor evacuated with the recovered adsorbent material through outlet 31 is recirculated into the recycling system, being returned through the orificed inlet 35 of the centrifugal separator 29. The remainder of the vapor which is not so returned to the system remains in the airtight hopper 30 and moves the recovered adsorbent material downward through valve 37, conduit 36 and orifice plate 38. The recovered adsorbent material is placed in position for return to the process through opening 15 in the slurry tank. The valve 37 may be used to withhold the recovered adsorbent material in the airtight hopper 30, if desired. The recovered adsorbent material may, however, be returned continuously to the process, in predetermined amounts, by the proper selection of the orifice plate 38.

Figures 2 and 3 show an elevation in section and a cross section view respectively of the tubular steam heater 20 mentioned above relative to the collection and mixing together of the recycled vapor forced through the system by centrifugal separator 29, and the vapor and adsorbent material particles which are passed upward through the jet 24 from the upper part of slurry tank 16. The purpose of the tubular steam heater is twofold in that it preheats the downward moving recycled vapor and heats the mixture of recycled vapor and vapor from the treating tank which passes upward through conduit 25. The heat thus supplied superheats the resultant vapor mixture and maintains it in vapor phase as it passes upward through conduit 25 to centrifugal separator 29 and also during the recycling through conduit 32. In operation, the tubular steam heater 20 receives the recycled vapor which moves downward from centrifugal separator 29 through conduit 32 to the upper equalizing chamber 40 above tube sheet 41. Steam passing into steam chamber 42 through inlet 21 circulates around tubes 43 and conduit 25, heats the downward circulating vapor in tubes 43 and the rising vapor mixture in conduit 25, and then passes out through steam outlet 22. The heated downward passing recycled vapor mixes with the upward rising vapor from the slurry tank at the mouth of jet 24, after passing through the lower equalizing chamber 44 below the lower tube sheet 45, and the resulting mixture flows, as indicated by the arrows, upward through conduit 25 in a superheated condition.

In summary, it will be evident from the disclosure above that the proper operation of the apparatus is dependent upon the adjustment of valve 34, which directly controls the passage of the vapor through the recycling system and indirectly affects the diverting of moisture from the opening 15 in which the adsorbent material is deposited in the slurry tank. The tubular steam heater, which is described as part of the recycling system, is used in the dual capacity of preheating the recycled vapor prior to mixing with the vapor from the top of the slurry tank and, by means of a second passage through the heater of the mixed vapors, insuring a state of superheat to maintain the mixture in vapor phase and prevent condensation within the recycling conduits. Finally, to insure the proper quantities of adsorbent materials being deposited in the liquid hydrocarbon stream, the particles of undeposited materials which are suspended in the vapor which flows upward through the recycling apparatus are recovered and returned to the process as desired.

Having now described and illustrated one form of the invention, it is to be understood that the invention is not to be limited to the specific form or arrangement of parts herein described and shown, except is so far as such limitations are specified in the appended claims.

I claim:

1. In a process for removing impurities from liquid hydrocarbons by the continuous-contact filtration process wherein predetermined quantities of finely divided particles of adsorbent material are added continuously to a body of preheated liquid hydrocarbons in a treating tank and vapors, containing entrained particles of adsorbent material, are formed within the tank: the steps of removing said vapors from the tank to a heating zone removed from the zone of admission of the adsorbent material to the tank and therein maintaining said vapors in vapor phase; conducting the vapors so heated in the heating zone to a separating zone and therein separating, from the vapors, the entrained adsorbent particles; returning said separated particles to the treating tank; and returning vapors, from which said particles have been so separated, to the heating zone and therein mixing them with the vapors being removed from the tank.

2. In a process for removing impurities from liquid hydrocarbons by the continuous-contact filtration process wherein predetermined quantities of finely divided particles of adsorbent material are added continuously to a body of preheated liquid hydrocarbons in a treating tank and vapors are formed, containing entrained particles of adsorbent material, within the tank: the steps of removing said vapors from the tank to a heating zone removed from the zone of admission of the adsorbent material to the tank and therein maintaining said vapors in vapor phase; conducting the vapors so heated in the heating zone to a separating zone and therein separating from the vapors the entrained adsorbent particles; returning said separated particles to the treating tank; exhausting vapors from which said particles have been separated; and controlling the outflow of exhausting vapors to thereby regulate the back pressure of the vapor in the tank, and thus control the downdraft operative upon the particles of adsorbent material being fed to the liquid hydrocarbons.

3. In a process for removing impurities from liquid hydrocarbons by the continuous-contact filtration process wherein predetermined quantities of finely divided particles of adsorbent material are added continuously to a body of preheated liquid hydrocarbons in a treating tank and vapors are formed, containing entrained particles of adsorbent material, within the tank: the steps of removing said vapors from the tank to a heating zone removed from the zone of admission of the adsorbent material to the tank, and therein maintaining said vapors in vapor phase; conducting the vapors so heated in the heating zone to a separating zone and therein separating, from the vapors, the entrained adsorbent particles; returning said separated particles to the treating tank; exhausting part of the vapors from which said particles have been separated, and returning the remaining part of said vapors to the heating zone and therein mixing them with the vapors being removed from the tank.

4. The process defined in claim 3 in which the outflow of vapors to the exhaust is controlled to regulate the back pressure of the vapors in the tank, and thus control the downdraft operative upon the particles of adsorbent material being fed to the liquid hydrocarbons.

5. An apparatus comprising a tank adapted to contain liquid hydrocarbons and having an aperture through which finely divided particles of adsorbent material are fed to the tank, in combination with a jet communicating with an opening in the tank in spaced relation to said aperture and through which vapors, escaping from the tank, are adapted to flow; a heater communicating with said jet in which the vapors are maintained in vapor phase; a passage through which vapors outflow from the heater; a centrifugal separator communicating with said passage, adapted to maintain suction therein and separate entrained adsorbent particles from said vapors; a conduit through which said separated adsorbent particles are returned to the treating tank; and a conduit communicating with the vapor space of the heater through which vapors, from which said particles have been separated, are returned to the heater and therein admixed with vapors being exhausted from the tank.

6. An apparatus comprising a tank adapted to contain liquid hydrocarbons and having an aperture through which finely divided particles of adsorbent material are fed to the tank, in combination with a heater communicating with an opening in the tank in spaced relation with said aperture, in which vapors escaping from the tank are adapted to flow and to be maintained in vapor phase; a passage through which vapors outflow from the heater; a centrifugal separator communicating with said passage adapted to maintain suction therein and to separate entrained particles of adsorbent material from said vapors; a conduit through which such separated particles are returned to the treating tank; a conduit through which the vapors, from which said particles have been separated, are exhausted; and pressure controlling means applied to the exhaust conduit to thereby regulate the back pressure in the tank and thus control the downdraft operative upon the particles of adsorbent material being fed to the liquid hydrocarbon in the tank.

7. An apparatus comprising a tank adapted to contain liquid hydrocarbons and having an aperture through which finely divided particles of adsorbent material are fed to the tank, in combination with a heater communicating with an opening in the tank, in spaced relation to said aperture, into which vapors escaping from the tank are adapted to flow and to be maintained in vapor phase; a passage through which vapors outflow from the heater; a centrifugal separator communicating with said passage which is adapted to separate entrained particles of adsorbent material from said vapors; a passage through which said separated particles are returned to the treating tank; and conduits through which vapors from which said particles have been separated are removed from the separator, one of said conduits being an exhaust conduit and the other of said conduits communicating with the vapor space of the heater in which the vapors from the separator are adapted to be admixed with vapors being exhausted from the tank.

8. The apparatus defined in claim 7 comprising a jet connecting said opening, into which escaping vapors adapted to flow from the tank, with the heater; and a pressure controlling means applied to the exhaust conduit to thereby regulate the back pressure in the tank and thus control the downdraft operative upon the particles of adsorbent material being fed to the liquid hydrocarbons in the tank.

9. In an apparatus for depositing finely divided adsorbent material in a stream of liquid hydrocarbons, a treating tank provided with an inlet and outlet for said hydrocarbon stream and an aperture in the top of said tank to admit adsorbent materials, a jet cooperating with said tank in spaced relation with said aperture to receive vapors from said treating tank, a conduit in communication with said jet, a centrifugal separator adapted to create suction in said conduit and separate entrained adsorbent particles from said vapors, a return conduit connecting the discharge of said centrifugal separator to said jet with a valve controlled branch venting to the atmosphere, a hopper cooperating with said centrifugal separator to receive separated adsorbent particles, and a tubular heater enclosing said conduits adjacent said jet.

DANIEL B. BANKS.

REFERENCES CITED

The following references are of record in the file of this patent:

UNITED STATES PATENTS

| Number | Name | Date |
|---|---|---|
| 1,897,389 | Harnsberger et al. | Feb. 14, 1933 |
| 2,377,657 | Watts | June 5, 1945 |
| 2,420,145 | McAfee | May 6, 1947 |
| 2,420,761 | Thomas | May 20, 1947 |